US008286895B2

(12) United States Patent
Alvi et al.

(10) Patent No.: US 8,286,895 B2
(45) Date of Patent: Oct. 16, 2012

(54) HIGH BANDWIDTH MICRO-ACTUATORS FOR ACTIVE FLOW CONTROL

(75) Inventors: Farrukh S. Alvi, Tallahassee, FL (US); Rajan Kumar, Tallahassee, FL (US); John T Solomon, Tallahassee, FL (US)

(73) Assignee: Florida State University Research Foundation, Tallahassee, FL (US)

( * ) Notice: Subject to any disclaimer, the term of this patent is extended or adjusted under 35 U.S.C. 154(b) by 421 days.

(21) Appl. No.: 12/800,129

(22) Filed: May 7, 2010

(65) Prior Publication Data

US 2010/0282858 A1 Nov. 11, 2010

Related U.S. Application Data

(60) Provisional application No. 61/215,625, filed on May 7, 2009.

(51) Int. Cl.

| | |
|---|---|
| ***B05B 1/08*** | (2006.01) |
| ***B05B 17/00*** | (2006.01) |
| ***B05B 1/26*** | (2006.01) |
| ***A01G 25/09*** | (2006.01) |

(52) U.S. Cl. ............. 239/101; 239/1; 239/499; 239/505

(58) Field of Classification Search .............. 239/1, 101, 239/294, 499, 504, 505
See application file for complete search history.

(56) References Cited

U.S. PATENT DOCUMENTS

| | | | | |
|---|---|---|---|---|
| 2,943,444 | A * | 7/1960 | Baxter | 239/265.17 |
| 4,041,984 | A * | 8/1977 | Morel | 137/842 |
| 6,924,004 | B2 * | 8/2005 | Rao et al. | 427/421.1 |

* cited by examiner

*Primary Examiner* — Len Tran
*Assistant Examiner* — Justin Jonaitis
(74) *Attorney, Agent, or Firm* — J. Wiley Horton

(57) ABSTRACT

A high bandwidth multi-stage microjet actuator. The actuator can produce relatively large amplitude flow disturbances over a broad range of frequencies. The disturbance frequency can be varied by altering the geometry of the device, altering the pressure ratio(s) within the device, and combinations of the two. The actuator has many potential applications, including noise abatement for jet aircraft, and flow control over a moving airfoil.

20 Claims, 7 Drawing Sheets

HIGH BANDWIDTH MICRO-ACTUATORS FOR ACTIVE FLOW CONTROL

CROSS-REFERENCES TO RELATED APPLICATIONS

This application is a non-provisional application claiming the benefit of an earlier-filed provisional application pursuant to 37 C.F.R. '1.53(c). The provisional application was assigned Ser. No. 61/215,625. It listed the same inventors and was filed on May 7, 2009.

STATEMENT REGARDING FEDERALLY SPONSORED RESEARCH OR DEVELOPMENT

None.

MICROFICHE APPENDIX

Not Applicable

BACKGROUND OF THE INVENTION

1. Field of the Invention

This invention relates to the field of flow control in a fluid. More specifically, the invention comprises the use of a multi-stage microjet-based actuator to create a highly unsteady flow field.

2. Description of the Related Art

Active control of fluid flow has many applications. One particular application involves noise suppression for aircraft. Another application is the control of flow separation over airfoils and lifting bodies. Because such flows typically involve rapid fluctuations, an actuator intended to achieve active control must be very responsive. Such an actuator must be able to create rapidly changing (highly unsteady) fluctuations in the flow.

Large scale supersonic impinging jets are known to create a highly unsteady flow field with a high mean and unsteady momentum. This flow field contains periodic pressure variations centered on certain frequencies. The same is true for small scale impinging jets. A supersonic microjet having a nozzle pressure ratio of 5.8 impinging upon a plate produces strong impinging tones in the range of 25-55 kHz. The resonance loop seen in larger jets is therefore also present in microjets.

The inventors have previously studied the effects of a microjet directed through a hole in a plate. Such a flow produces edge/hole tones. If the microjet's shear layer grazes the edge of the hole large amplitude tones—referred to as "hole tones" are produced. The hole tones tend to be lower in amplitude than simple impingement.

Still others have investigated the effects of a microjet directed into a cylindrical cavity having a closed bottom (a "blind hole"). This flow produced high amplitude tones in a suitable range of frequencies ("suitable" in terms of their possible application to active flow control). These prior results led the inventors to create the present invention, which serves the need for an actuator which can produce high-amplitude disturbances over a wide range of frequencies.

BRIEF SUMMARY OF THE INVENTION

The present invention comprises a multi-stage microjet actuator. The actuator can produce large amplitude flow disturbances over a broad range of frequencies. The disturbance frequency can be varied by altering the geometry of the device, altering the pressure ratio(s) within the device, and combinations of the two. The actuator has many potential applications, including noise abatement for jet aircraft, and flow control over a moving airfoil.

REFERENCE NUMERALS IN THE DRAWINGS

| | |
|---|---|
| 10 | micro actuator |
| 12 | primary nozzle |
| 14 | primary nozzle exit plane |
| 16 | source jet |
| 18 | impingement block |
| 20 | cylindrical cavity |
| 22 | micronozzle |
| 24 | cavity floor |
| 26 | cavity entrance plane |
| 28 | cavity floor plane |
| 30 | micronozzle exit plane |
| 32 | pressure transducer |
| 34 | microjet |
| 36 | Mach disk |
| 38 | shock cell |
| 40 | variation range |
| 42 | movable insert |
| 44 | cavity housing |

DETAILED DESCRIPTION OF THE INVENTION

The inventive method proposes to create a microjet having an oscillating pressure, where the variable component is a significant portion of the total pressure. Further, the inventive method proposes to alter the device creating the microjet so that the frequency of oscillation can be grossly and finely adjusted.

Figure 1:
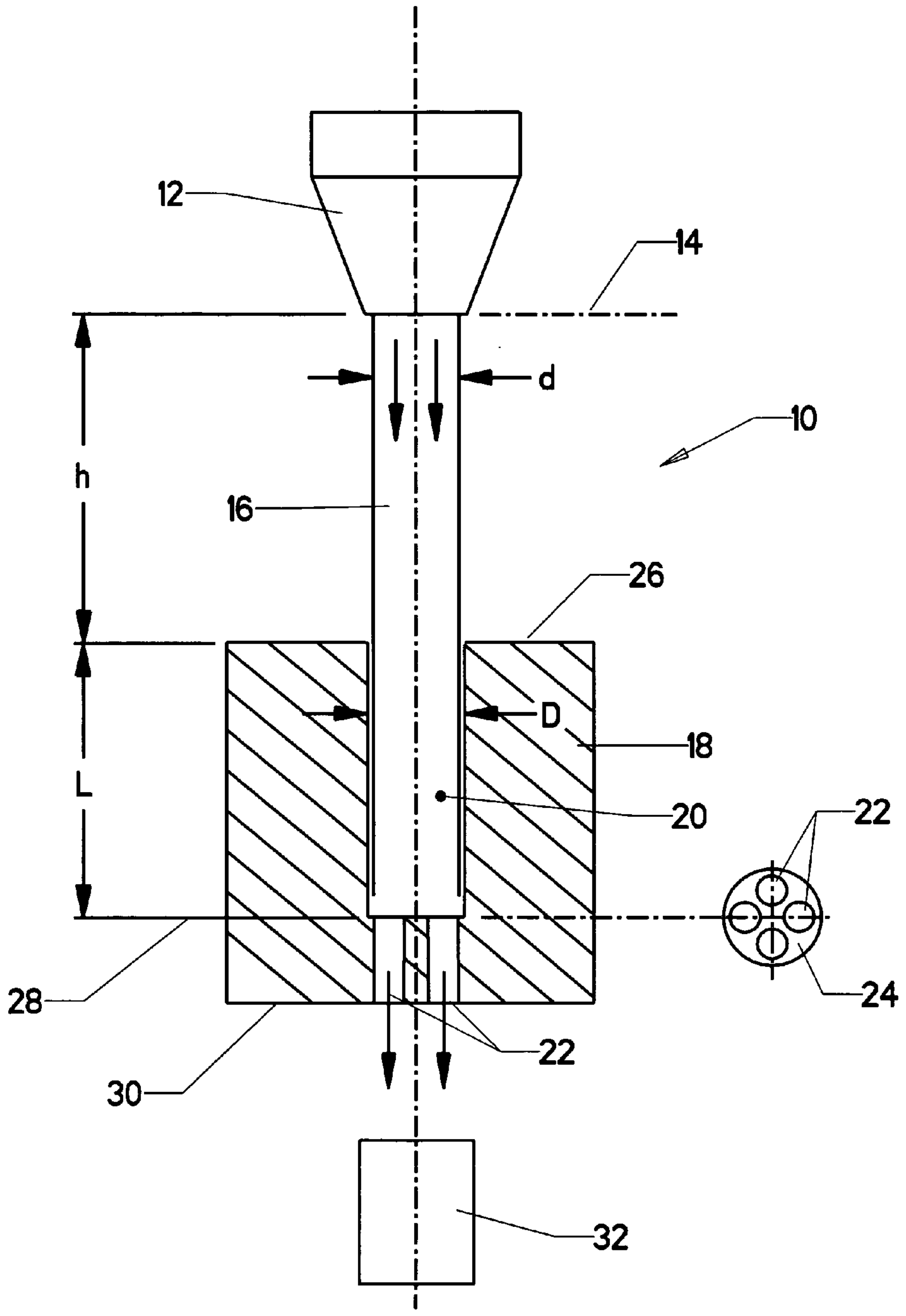
FIG. 1 is an elevation view, showing the components of the proposed actuator.

FIG. 1 shows a simplified depiction of a device used to create an oscillating microjet-microjet actuator 10. Primary nozzle 12 directs source jet 16 toward impingement block 18 (The term "impingement block" should be viewed as encompassing any component which can define the necessary cavity). The impingement block contains cylindrical cavity 20, which is aligned with the source jet. The cylindrical cavity does not extend all the way through the impingement block, but instead stops at cavity floor plane 28.

One or more small passages—designated as micronozzles 22—pass from cavity floor plane 28 to micronozzle exit plane 30. These are substantially parallel to source jet 16 (The center axis of each micronozzle is within 5 degrees of the center axis of the primary jet). However, in other configurations, one may design actuators with micronozzles which are offset from the center axis of the primary jet by more than 5 degrees). Thus, when primary nozzle 12 directs source jet 16 into impingement block 18, micronozzles 22 generate microjets. These extend downward in the orientation shown in the view.

The small view on the right side of FIG. 1 is a plan view of cavity floor 24, omitting the other features of the micro actuator. In this particular embodiment, an array of four micronozzles 22 is used. This is merely a design choice. In other embodiments one, two, three, five, or more micronozzles could be used. The geometric pattern of the micronozzles could be varied as well.

In order to be useful in the flow control and noise attenuation applications for small to mid-scale models (by no means the only applications for the present invention) the microjet frequency of oscillation should lie between about 1 KHz and about 60 KHz. The microjets themselves are supersonic, though the pressure oscillation may cause them to become subsonic for a portion of the cycle. The mean velocity of the microjet is typically 300-400 meters per second, with the unsteady component being about 50 to 100 meters per second.

Several geometric features are significant to the operation of the device. Referring again to FIG. 1, these include: (1) the source jet diameter (“d”); (2) the cylindrical cavity diameter (“D”); (3) the distance between primary nozzle exit plane 14 and cavity entrance plane 26 (“h”); (4) the distance between cavity entrance plane 26 and cavity floor plane 28 (“L”); (5) the distance between cavity floor plane 28 and micronozzle exit plane 30; (6) the micronozzle diameter; and (7) the configuration of the array of micronozzles, if an array is used.

In order to produce the aforementioned frequency range, it is preferable to vary the ratio h/d from about 1.0 to about 2.0. L is preferably varied from about 1 mm to about 5 mm. The nozzle pressure ratio is preferably varied from about 1.9 to about 6.5. The reader should bear in mind that geometric and flow parameters lying in a different range may be used as required by the specific application.

The reader may wish to know representative dimensions for a particular embodiment. For one example, the source jet issued from a 1.0 mm converging nozzle (The source jet is preferably moderately to strongly underexpanded). An array of four micronozzles (as in FIG. 1) was used. Each micronozzle had a diameter of 400 μm. A pressure transducer was used to measure the flow characteristics of the microjets. FIG. 1 shows pressure transducer 32 in a suitable location. The transducer was placed so that the microjets would travel approximately 2 mm before impinging upon it.

The main parameters governing the behavior of the resulting flow were h, L, and the source jet pressure ratio (nozzle pressure ratio). The device will operate over a wide range of these parameters. At some values steady flow is produced, while at others highly oscillating flow is produced. High amplitude peaks occur at discrete frequencies. Significantly, a modest variation in h/d produces a relatively large shift in the frequency of the peak amplitude. As an example, at h/d=1.3 and a constant nozzle pressure ratio of 4.8, a spectral peak of about 157 dB occurred at a frequency of about 58 kHz. When h/d was shifted to 1.8, the amplitude was about 141 dB at a frequency of about 42 kHz. Furthermore, the spectral peaks became broader with increasing h/d and beyond an h/d of 1.8 there was no distinct spectral peak.

Variations in the primary nozzle pressure ratio also significantly alter the amplitude and resonant frequency of the microjets produced. Looking at FIG. 1, those skilled in the art will realize that the h/d ratio can be altered simply by moving primary nozzle 12 closer to impingement block 18. The primary nozzle pressure ratio can be altered by altering the pressure fed into the nozzle. It is also possible to alter the nozzle geometry itself. Adjusting the L/d ratio is a gross adjustment in terms of the frequency of resonance produced, while adjusting nozzle pressure ratio and the ratio h/d are more likely to produce fine adjustments.

Figure 2:
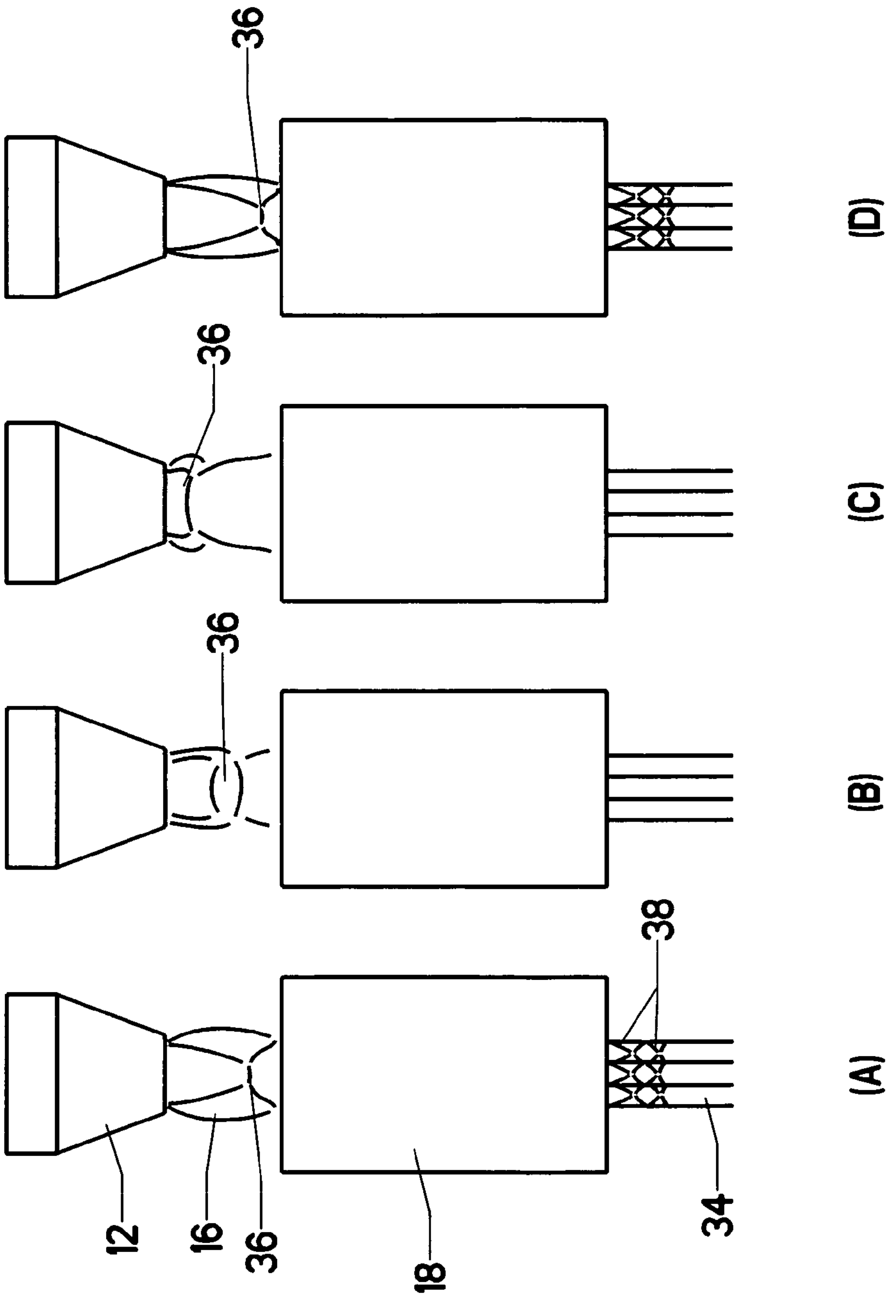
FIG. 2 is an elevation view, showing a representative depiction of the cyclic nature of the flow produced by the proposed actuator.

The use of impinging jet resonance allows the actuator to produce highly unsteady flow. FIG. 2 graphically depicts the resonant nature of the flow. The reader should understand that FIG. 2 is a simplified depiction of complex phenomena. It represents one possible configuration which produces cyclic variations. The primary jet and secondary microjets would not necessarily display the same characteristics in a different configuration. However, the outcome is the same-highly unsteady subsonic/supersonic microjets.

With these thoughts in mind, the reader will note that in FIG. 2(A), source jet 16 produces a Mach disk 36 that is fairly close to impingement block 18. Microjets 34 are supersonic, displaying characteristic shock cells 38.

In FIG. 2(B), the flow has decelerated. Mach disk 36 has moved upward and the microjets have gone subsonic. In FIG. 2(C), Mach disk 36 has moved even further upward and the flow has further decelerated. The flow will then accelerate again. FIG. 2(D) shows the peak flow of this particular cycle. Mach disk 36 has moved further downward and somewhat elongated shock cells are visible in the microjets.

The inlet to the cavity is preferably placed within the region of instability, which is the pressure recovery region of the first shock cell of the primary jet. Variations in the placement of the cavity inlet with respect to the shock cells of the primary jet are primarily responsible for the variations seen in FIG. 2.

The phenomena illustrated in FIG. 2 occur too rapidly to be visible to the naked eye. The oscillation occurs on the order of 10 kHz. The range desired for many flow control applications is 1-10 kHz. However, the proposed actuator may be configured to produce oscillations ranging from 10/100 Hz to 100’s of kHz. The proposed actuator is capable of producing large amplitudes in this range of frequencies as well. Large variation in both the amplitude and the frequency is possible, properties that are highly desirable for flow control.

The microjets produced by this configuration possess very high momentum (mean velocities generally greater than 300 m/s). Additionally, they can contain a substantial periodic variation (about 70-100 m/s). By using very small variations in the actuator dimensions (typically only a few hundred microns) the frequency of the unsteady component could be tuned over intervals of 10-15 kHz. These actuators are therefore suitable for many flow control applications.

Figure 3:
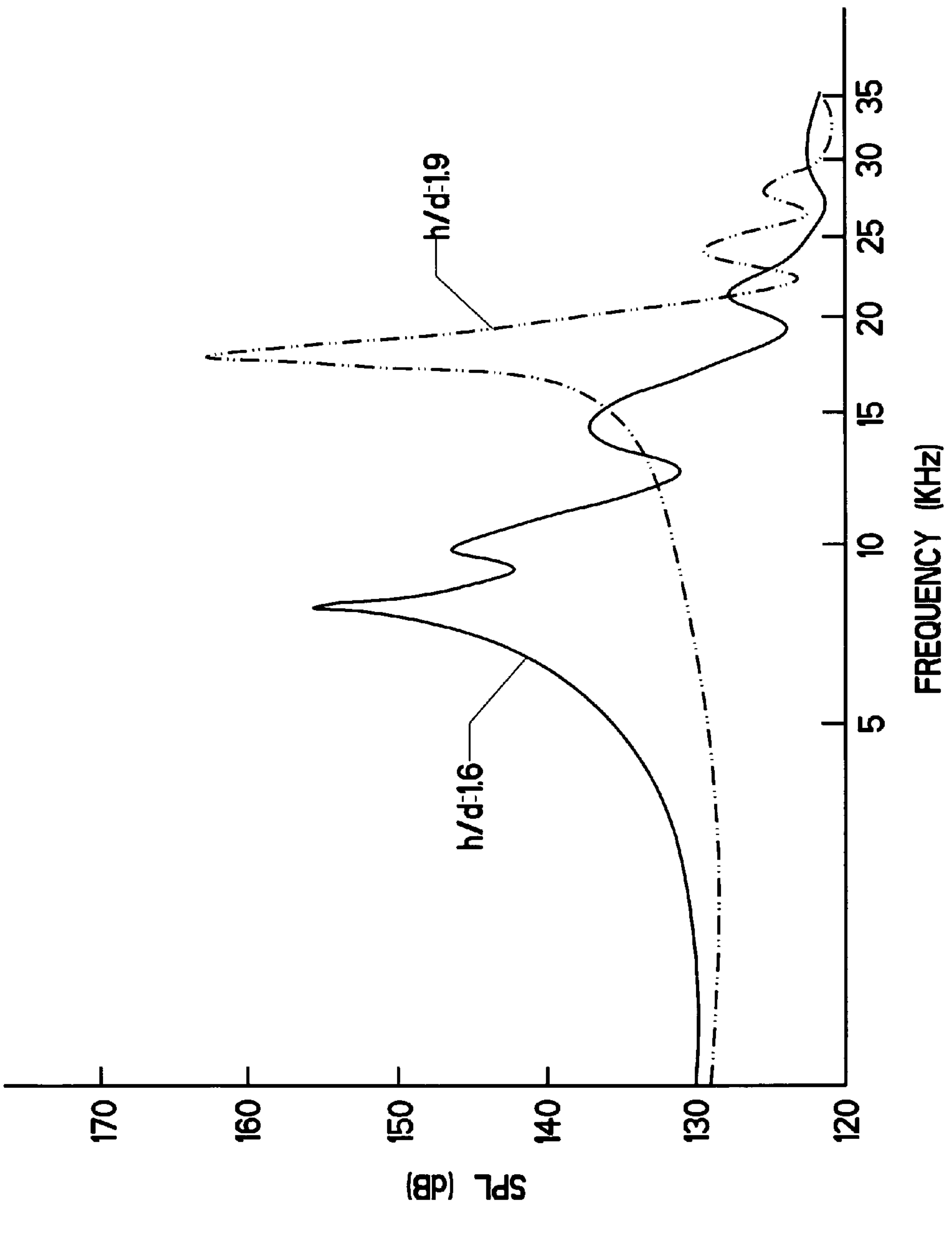
FIG. 3 is a plot of amplitude versus frequency for an actuator constructed according to the present invention, where the h/d ratio is varied.

As mentioned previously, varying the ratio L/d produces a large shift in the frequency of oscillation. Varying nozzle pressure ratio or the ratio h/d produces a smaller shift. FIG. 3 depicts spectral peak (dB) versus frequency of microjet oscillation while varying the ratio h/d. The reader will observe that varying the h/d ratio from 1.6 to 1.9 produces a relatively modest frequency shift.

Figure 4:
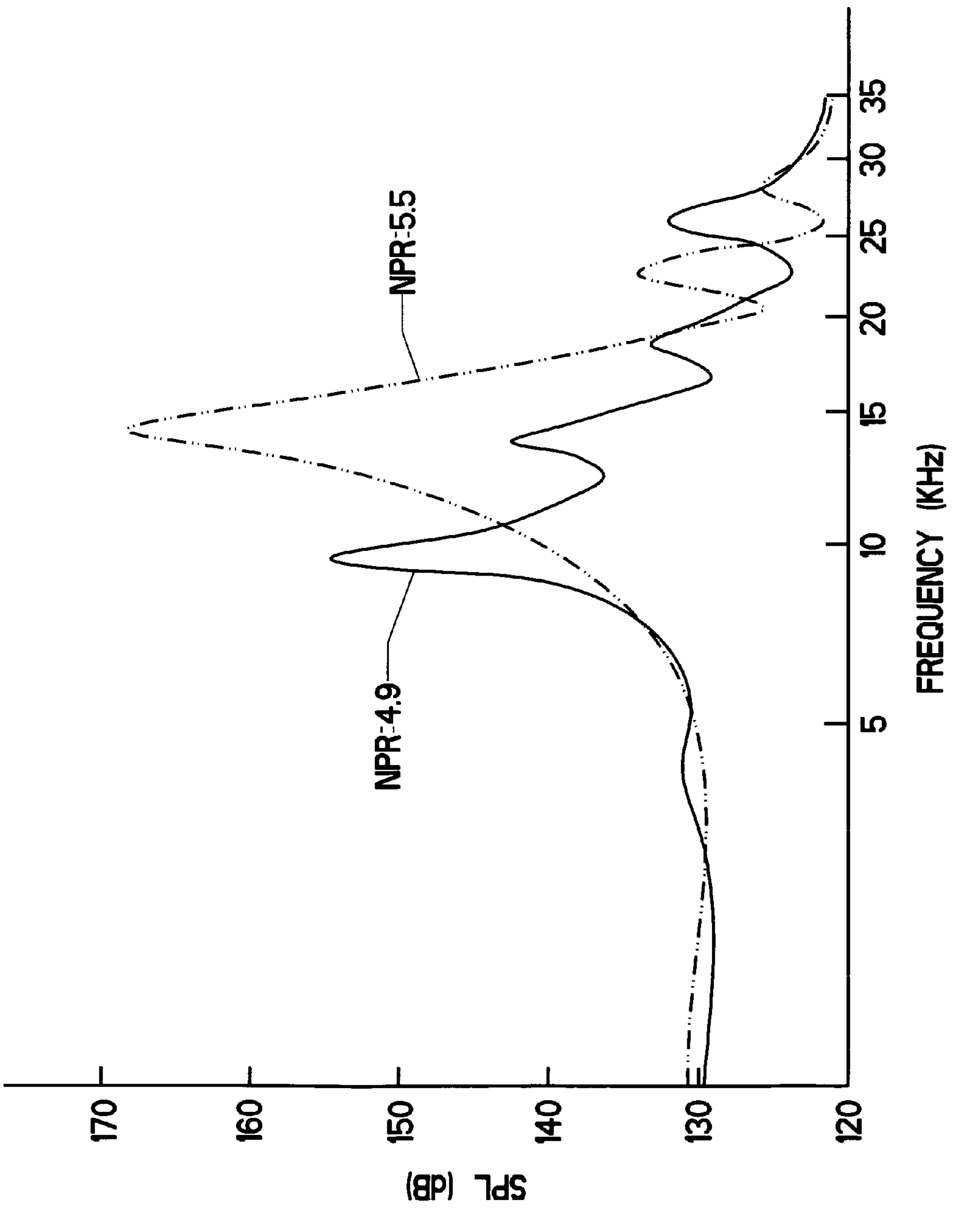
FIG. 4 is a plot of amplitude versus frequency for an actuator constructed according to the present invention, where the nozzle pressure ratio is varied.
Figure 5:
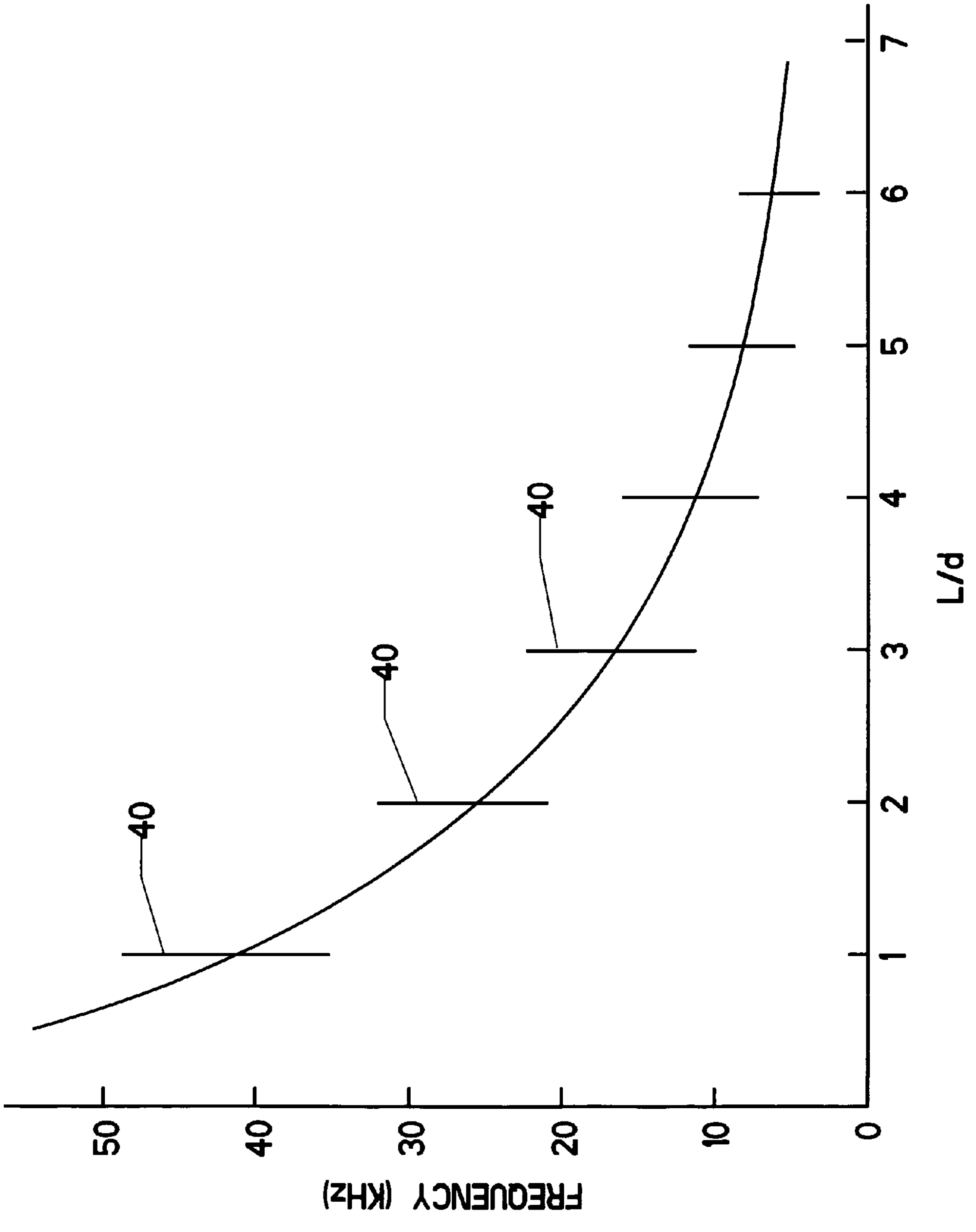
FIG. 5 is a plot of actuator frequency versus L/d ratio for an actuator constructed according to the present invention.

FIG. 4 illustrates the shift in frequency when varying the nozzle pressure ratio (“NPR”) from 4.9 to 5.5. Again, the frequency shift is relatively modest. FIG. 5, however, shows a plot of oscillation frequency (KHz) versus the ratio L/d. The reader will observe a substantial shift in frequency. Thus, the ratio L/d may be used as a gross adjustment while NPR and the ratio h/d are used to “fine tune” the desired frequency. For each value for L/d, a variation range 40 exists. Adjusting NPR and/or the ratio h/d can move the frequency within this available variation range.

Figure 6:
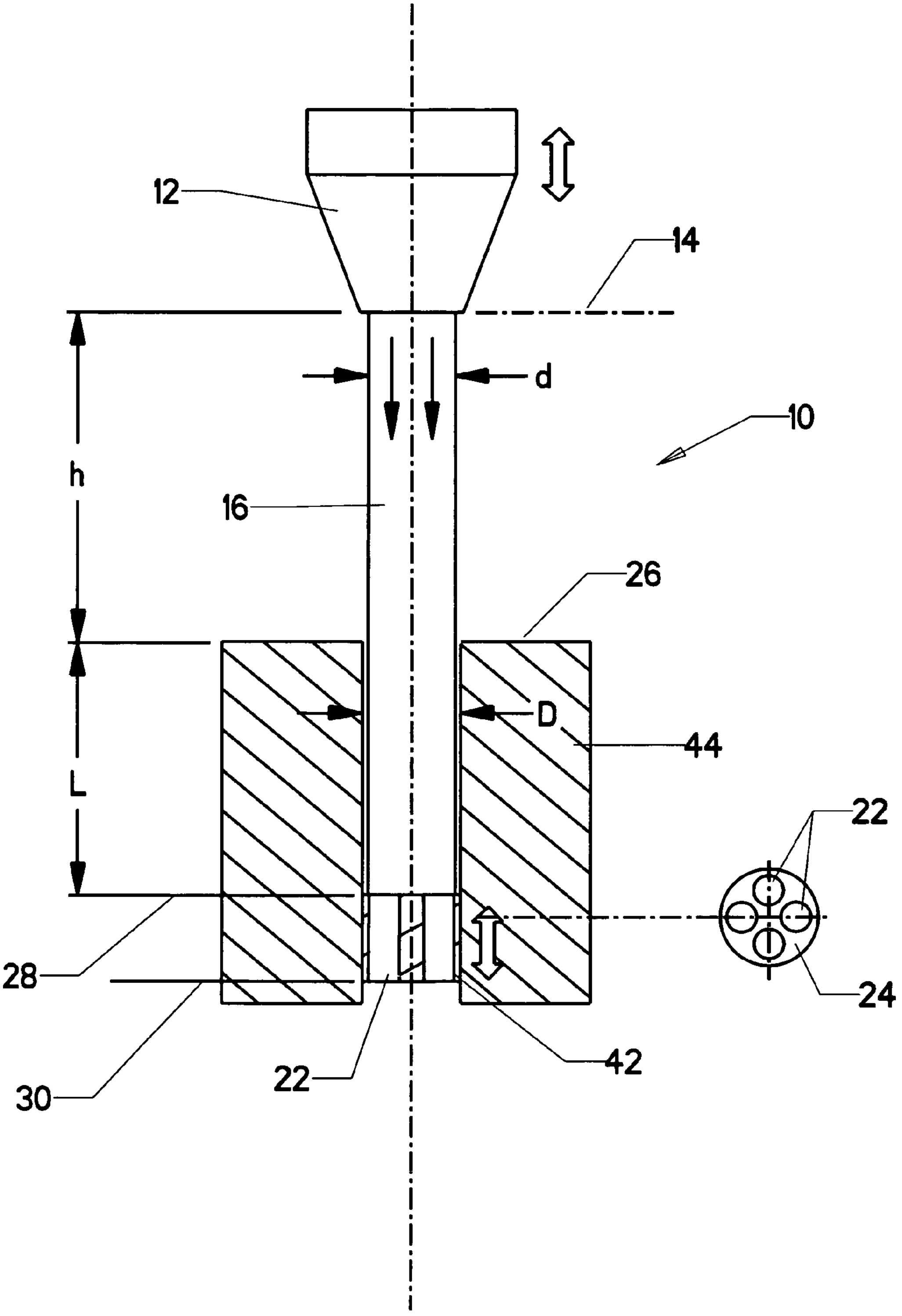
FIG. 6 is an elevation view, showing an actuator having variable primary and secondary nozzle geometry.
Figure 7:
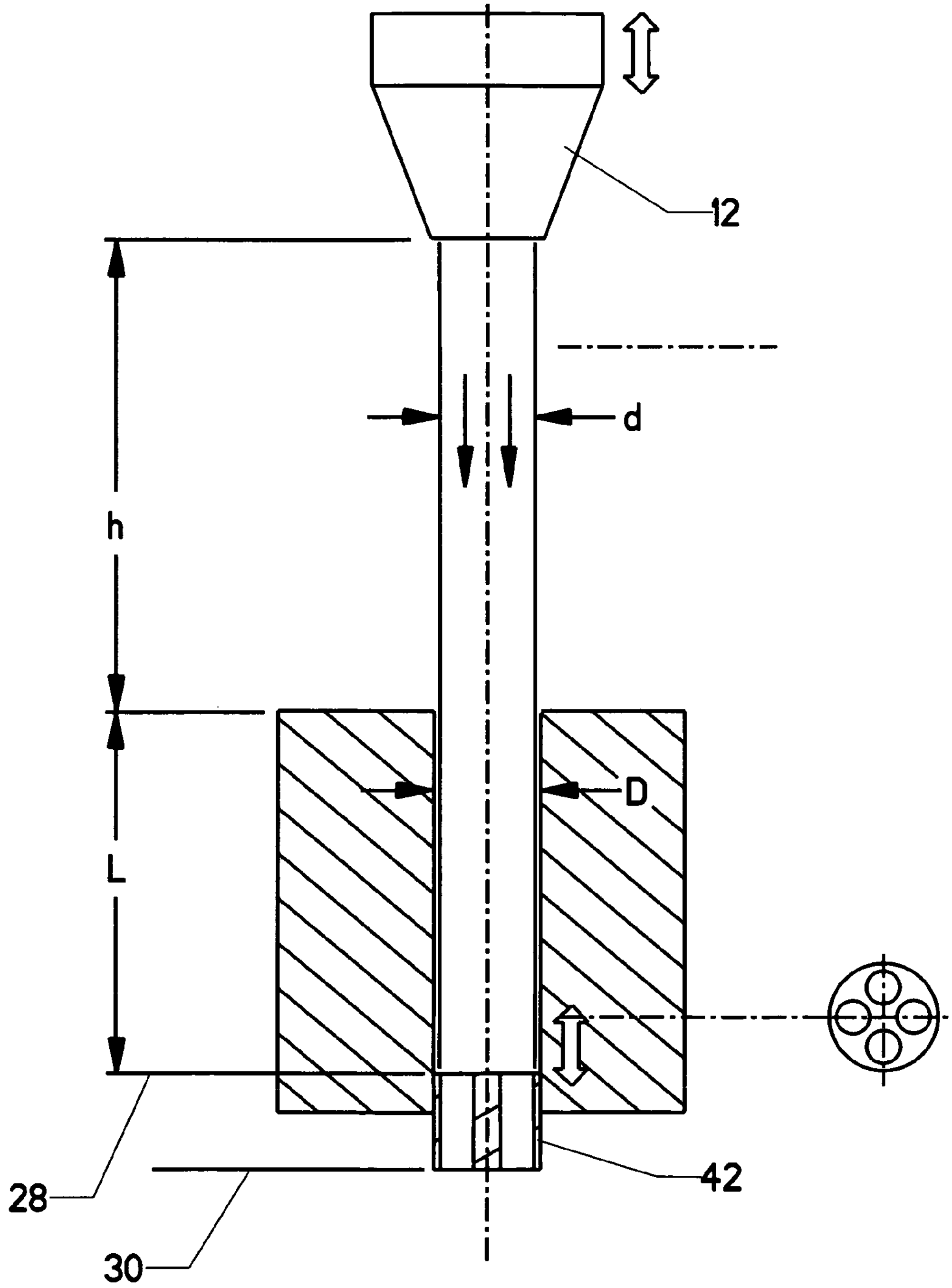
FIG. 7 is an elevation view, showing an actuator having variable primary and secondary nozzle geometry.

Those skilled in the art will realize that many different mechanisms could be used to actually vary the geometry of the actuator. FIGS. 6 and 7 show two examples. In FIG. 6, primary nozzle 12 is made movable with respect to cavity housing 44. Moving the nozzle alters the value "h" and thus alters the ratio h/d.

The micronozzles 22 are mounted on movable insert 44. This component can move up and down within cavity housing 44, thereby changing the distance "L" and changing the ratio L/d. FIG. 7 illustrates primary nozzle 12 moved away from the cavity housing and movable insert 42 moved to a lower position within the housing. Referring back to FIG. 1, the reader may easily perceive how these alterations affect the controlling parameters.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Many modifications and other embodiments of the invention will come to mind to one skilled in the art to which this invention pertains having the benefit of the teachings presented in the foregoing descriptions and the associated drawings. Accordingly, the present invention is not limited to the specific embodiments illustrated herein, but is limited only by the claims.

Having described our invention, we claim:

1. A method for creating a microjet having a desired frequency of pressure oscillation, comprising:

a. providing a primary nozzle, said primary nozzle directing a primary jet of compressible fluid with said primary jet exiting said primary nozzle at a primary nozzle exit plane, said primary jet having a diameter "d";

b. providing a source of pressurized gas through said primary nozzle to create said primary jet, said pressurized gas flowing through said nozzle creating a nozzle pressure ratio;

c. providing an impingement block including a cavity commencing at a cavity entrance plane parallel to said primary nozzle exit plane and separated therefrom by a distance "h";

d. said cavity including a cavity floor separated from said cavity entrance plane by a distance "L";

e. said cavity including at least one micronozzle extending through said cavity floor; and f. adjusting the ratio L/d to produce a pressure oscillation in said microjet which is approximately equal to said desired frequency of pressure oscillation.

2. A method for creating a microjet having a desired frequency of pressure oscillation as recited in claim 1, further comprising adjusting said nozzle pressure ratio in order to alter said frequency of pressure oscillation to more nearly match said desired frequency of pressure oscillation.

3. A method for creating a microjet having a desired frequency of pressure oscillation as recited in claim 1, further comprising adjusting the ratio h/d in order to alter said frequency of pressure oscillation to more nearly match said desired frequency of pressure oscillation.

4. A method for creating a microjet having a desired frequency of pressure oscillation as recited in claim 2, further comprising adjusting the ratio h/d in order to alter said frequency of pressure oscillation to more nearly match said desired frequency of pressure oscillation.

5. A method for creating a microjet having a desired frequency of pressure oscillation as recited in claim 3, further comprising moving either said primary nozzle or said impingement block in order to adjust said ratio h/d.

6. A method for creating a microjet having a desired frequency of pressure oscillation as recited in claim 1, wherein said step of adjusting said L/d ratio comprises:

a. providing a movable insert in said impingement block, said movable insert including said cavity floor and said at least one micronozzle; and b. moving said movable insert with respect to said cavity entrance plane in order to vary L and thereby adjust said L/d ratio.

7. A method for creating a microjet having a desired frequency of pressure oscillation as recited in claim 6, further comprising moving either said primary nozzle or said impingement block in order to adjust said ratio h/d.

8. A method for creating a microjet having a desired frequency of pressure oscillation, comprising:

a. providing an impingement block, said impingement block opening into a cavity at a cavity entrance plane;

b. providing a primary nozzle directing a primary jet having a diameter "d" into said cavity, said primary nozzle being separated from said cavity entrance plane by a distance "h";

c. said cavity having a cavity floor separated from said cavity entrance plane by a distance "L";

d. said cavity floor having at least one micronozzle extending therefrom, said micronozzle being parallel to said primary jet; and e. adjusting the ratio L/d to produce a frequency of pressure oscillation in said microjet which closely approximates said desired frequency of pressure oscillation.

9. A method for creating a microjet having a desired frequency of pressure oscillation as recited in claim 8, further comprising adjusting said nozzle pressure ratio in order to alter said frequency of pressure oscillation to more nearly match said desired frequency of pressure oscillation.

10. A method for creating a microjet having a desired frequency of pressure oscillation as recited in claim 1, further comprising adjusting the ratio h/d in order to alter said frequency of pressure oscillation to more nearly match said desired frequency of pressure oscillation.

11. A method for creating a microjet having a desired frequency of pressure oscillation as recited in claim 9, further comprising adjusting the ratio h/d in order to alter said frequency of pressure oscillation to more nearly match said desired frequency of pressure oscillation.

12. A method for creating a microjet having a desired frequency of pressure oscillation as recited in claim 10, further comprising moving either said primary nozzle or said impingement block in order to adjust said ratio h/d.

13. A method for creating a microjet having a desired frequency of pressure oscillation as recited in claim 8, wherein said step of adjusting said L/d ratio comprises:

a. providing a movable insert in said impingement block, said movable insert including said cavity floor and said at least one micronozzle; and b. moving said movable insert with respect to said cavity entrance plane in order to vary L and thereby adjust said L/d ratio.

14. A method for creating a microjet having a desired frequency of pressure oscillation as recited in claim 13, further comprising moving either said primary nozzle or said impingement block in order to adjust said ratio h/d.

15. A method for creating a microjet having a significant pressure oscillation, comprising:

a. providing a cylindrical cavity commencing at a cavity entrance plane;

b. providing a primary nozzle directing a primary jet having a diameter "d" into said cavity, said primary nozzle being separated from said cavity entrance plane by a distance "h";

c. said cavity ending in a floor separated from said cavity entrance plane by a distance "L";

d. providing at least one micronozzle extending from said cavity floor; and e. adjusting the ratio L/d to produce a desired range of frequencies of pressure oscillation in said microjet.

16. A method for creating a microjet having a desired frequency of pressure oscillation as recited in claim 15, further comprising adjusting said nozzle pressure ratio in order to alter said frequency of pressure oscillation to a desired frequency within said range of frequencies.

17. A method for creating a microjet having a desired frequency of pressure oscillation as recited in claim 15, further comprising adjusting the ratio h/d in order to alter said frequency of pressure oscillation to a desired frequency within said range of frequencies.

18. A method for creating a microjet having a desired frequency of pressure oscillation as recited in claim 16, further comprising adjusting the ratio h/d in order to alter said frequency of pressure oscillation to a desired frequency within said range of frequencies.

19. A method for creating a microjet having a desired frequency of pressure oscillation as recited in claim 17, further comprising moving either said primary nozzle or said impingement block in order to adjust said ratio h/d.

20. A method for creating a microjet having a desired frequency of pressure oscillation as recited in claim 15, wherein said step of adjusting said L/d ratio comprises:

a. providing an impingement block to house said cylindrical cavity, said impingement block including a movable insert, said movable insert including said cavity floor and said at least one micronozzle; and b. moving said movable insert with respect to said cavity entrance plane in order to vary L and thereby adjust said L/d ratio.

* * * * *